Feb. 17, 1942.                    E. H. POVEY ET AL                    2,273,066
              METHOD AND MEANS FOR DETERMINING QUALITIES OF DIELECTRICS
                              Filed April 26, 1938

Inventors
Edmund H. Povey
Eric A. Walker
by Wright, Brown, Quinby
& May
Attys.

Patented Feb. 17, 1942

2,273,066

UNITED STATES PATENT OFFICE 2,273,066

METHOD AND MEANS FOR DETERMINING QUALITIES OF DIELECTRICS

Edmund H. Povey and Eric A. Walker, Medford, Mass., assignors to Doble Engineering Company, Medford, Mass., a corporation of Massachusetts Application April 26, 1938, Serial No. 204,324

5 Claims. (Cl. 175—183)

This invention relates to testing and determining the resistive and reactive components of complex impedances, such as capacitors or inductors. It particularly is concerned with apparatus and methods for testing dielectrics, and more particularly fabricated articles and forms of dielectric materials designed or applied for industrial use to confine electrical currents in prescribed paths. Such fabricated dielectrics include oil circuit breaker bushings, transformer bushings, stack, pin, and suspension type insulators, potheads, the insulation in circuit breakers, that of transformer windings, cables, etc., and many other forms and articles, all comprehensively included within the term "insulation" as used in this specification; which term is equivalent to "dielectric."

An important object of the invention is to provide apparatus which may be used to measure the energy loss and charging current in dielectrics under the stress of an alternating voltage, to measure the equivalent series or parallel alternating current resistance and the capacitance of the insulation, and to show the component of current which is in phase with the voltage, and vice versa, in making of tests. A part of the object is to provide portable apparatus which can be used in the field, i. e., the locations in which the insulation or insulators are installed, for taking measurements determinative of the values above referred to in insulation installed for industrial use. Such insulation and insulators are usually installed with one terminal grounded, wherefore it is necessary that the testing apparatus be capable of making measurements between a high tension terminal and a grounded terminal. Our object includes the provision of an apparatus having this capability, and one which can be used as well for determining the same qualities when neither terminal of the insulation is grounded.

The invention comprises apparatus, the principles of which may be embodied in many different forms, including compact portable apparatus capable of being readily transported and set up for use in the field or in the laboratory, and other forms adapted for laboratory use only. These principles and the nature of the invention can best be explained with reference to the diagrams shown in the accompanying drawing, in which—

Figure 1:
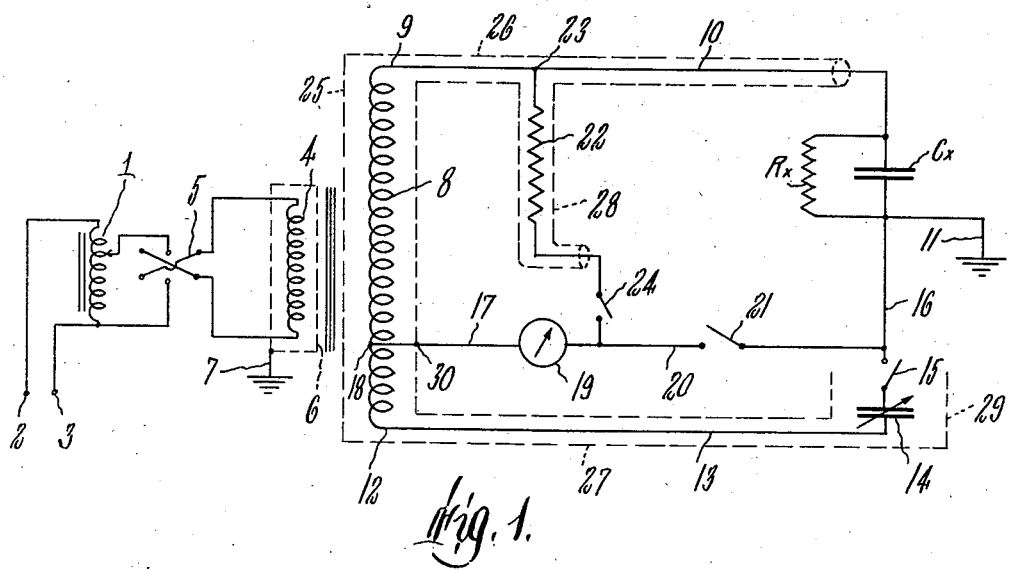
Fig. 1 is a wiring diagram showing the parts of the apparatus by conventional symbols, and including a representation of one form of shielding.

Referring first to Fig. 1, the reference character 1 designates a potentiometer having terminals 2 and 3 adapted to be connected with a current supply, such as the standard 60 cycle commercial current at 110 volts or 220 volts, and 4 represents the primary (low voltage) winding of a voltage step-up transformer which is connected to the potentiometer by a reversing switch 5 operable to shift the phase of the test voltage by 180 electrical degrees. This switch is utilized in field testing where there is electrostatic or electromagnetic induction, in order to cancel the effects of such induction in the manner later described. 6 represents a shield enclosing the primary winding 4 and grounded at 7.

The secondary winding 8 of the step-up transformer is connected at its high tension terminal 9 with a lead conductor 10 adapted to be connected with the high tension terminal of the insulation being tested. The test specimen is represented in the diagram by a capacitor $C_x$ and a resistance $R_x$ in parallel electric connection. The low tension terminal of the test specimen is represented as grounded at 11. The low tension terminal 12 of the secondary winding 8 is connected through a conductor 13 to a standard variable condenser 14; which condenser is adapted to be connected with the grounded terminal of the test specimen by a switch 15 and conductor 16.

A tap conductor 17 is connected to the secondary winding 8 at an intermediate point 18 and leads to a measuring instrument 19 which is preferably an alternating current meter; although, as later appears, another form of meter may be substituted for it. A conductor 20 in which is interposed a switch 21 leads to a connection with the grounded terminal of the insulation under test. A resistance 22 is connected to the high tension lead conductor 9 at 23 and may be put in circuit with the meter 19 and the secondary winding 8 by a switch 24.

By means of the potentiometer, an alternating voltage of any desired value may be induced in the secondary winding of the step-up transformer, and this voltage is applied through the lead conductor 10 to the high tension terminal of the test specimen. For the purposes of this description the said secondary winding will be considered as the source of alternating test voltage, with the understanding that the term "source" includes within its scope the original voltage generator, any other part of the voltage supply, and all equivalent sources. The voltage difference between the high tension terminal 9 and the tap connection 18 may be of any convenient value. The voltage between this tap and the low tension terminal 12 is conveniently, although not necessarily, less than that between 9 and 18. Voltage differences of from 2,000 to 10,000 volts between 9 and 18, and from 500 to 1,000 between the points 18 and 12, are suitable for regular use. But these are illustrative and not limiting values. It is essential that the phase difference between the two voltages at respectively opposite sides of the tap be constant under varying conditions of load, in order to eliminate error in the indications of the meter 19. Such constancy can readily be achieved by proper design of the transformer windings. But in any case where a variation in phase relationship with load occurs, correction may be made by connecting a phase shifter in the circuit, in a manner well understood by electrical engineers, or by other well known methods.

The transformer secondary 8, the leads 10 and 13 from its terminals, and the resistance 22 and standard condenser 14 are enclosed within a connected system of shielding, shown by broken lines in Fig. 1, and of which the several parts are designated 25, 26, 27, 28 and 29. This shielding system intercepts charging and leakage currents from the transformer secondary, the resistance 22, said leads and the condenser 14. It is connected at 30 to the tap conductor, whereby all such charging and leakage currents are returned to the transformer winding at 18 and do not flow to ground through the meter 19. The grounded shield 6 of the primary winding prevents charging currents picked up by the shield of the secondary winding from flowing to ground through the meter. Thus the meter is affected only by the currents through the test specimen and other prescribed paths, and its indications are not vitiated by other currents.

Figure 2:
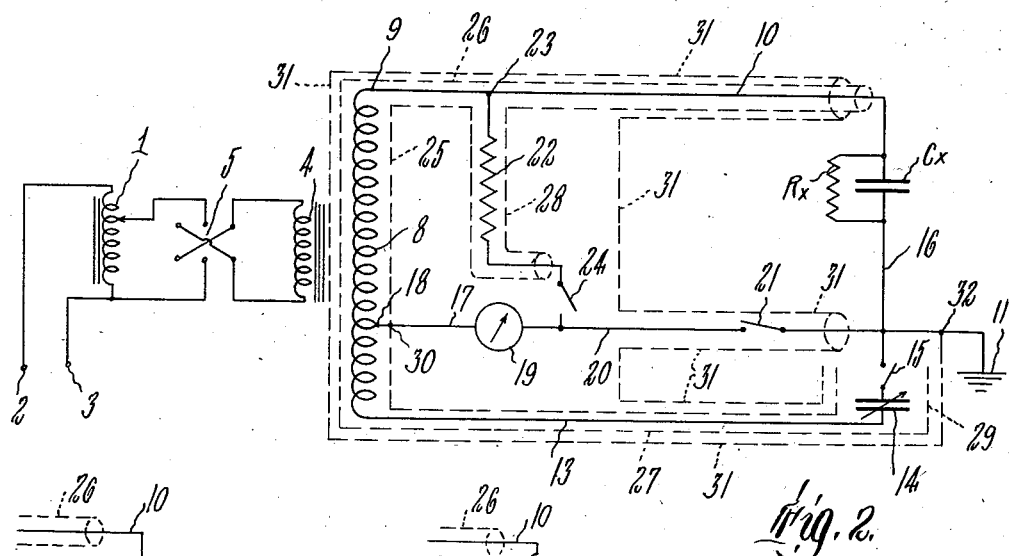
Fig. 2 is a similar diagram which differs from Fig. 1 in showing a different form of shielding.

The arrangement shown in Fig. 2 is essentially like that shown in Fig. 1 with the exception only of the shielding system; and corresponding parts are designated by the same reference characters. The shielding system here shown differs in that, in place of the shield 6 for the primary winding, there is substituted an outer shield 31 which encloses the shielding system 25—29 and is grounded through a connection 32. This outer shielding system 31 prevents generation of voltages in the inner shield system due to induction in electrostatic fields where tests are being made. Such induced voltages, if allowed to occur, would cause flow of current to ground through the measuring means and produce erroneous indications. Both shielding systems provided grounded shielding means preventing charging or leakage currents originating in the apparatus itself from flowing through the measuring means. They make an isolated system and keep substantially all charging and leakage currents in their prescribed paths.

The meter 19 has such a low impedance that it is generally not necessary to maintain a constant capacitance between guard (30) and ground (11); but it is within our contemplation to provide such a capacitance in any embodiment of the invention where it may be necessary or desirable.

The resistance 22 is so designed, in accordance with principles well understood by electrical engineers, and given a value such that, when the switch 24 is closed and the switches 21 and 15 are open, it permits current flow, of which the indication by the current meter 19 is a correct measure of the voltage applied to the specimen. The voltage applied in any test is determined, therefore, by taking a reading of the meter with the switch 24 closed and the switches 15 and 21 open.

In order to determine the capacitance of the test insulation, the switch 21 is closed and switches 15 and 24 opened. This causes the total current flowing through the specimen to pass through the meter 19. The frequency and voltage being known, the capacitance $C_x$ of the specimen may be readily calculated by the formula:

(1) $$C_x = \frac{\sqrt{I^2 - \frac{E^2}{R_x^2}}}{E\omega}$$

Where E is the voltage applied to the specimen, $R_x$ is the equivalent parallel resistance of the specimen, I is the current flowing through the specimen, $\omega = 2\pi$ frequency of the voltage.

If the insulation is of good, or even fair, quality, the value of the equivalent parallel resistance $R_x$ is so high that the fraction $$\frac{E^2}{R_x^2}$$

becomes a negligible quantity and the formula reduces to:

(2) $$C_x = \frac{I}{E\omega}$$

To measure quantities determinative of the energy loss in, and the equivalent resistance of, the specimen, the switches 15 and 21 are closed while switch 24 is opened. Then two currents tend to flow simultaneously through the meter. One is determined by the voltage applied to, and the impedance of, the test specimen. The other is determined by the voltage between the tap 18 and terminal 12 of the transformer secondary winding and the reactance of the standard condenser 14, which has negligible loss. These currents tend to flow in opposite directions and they oppose one another. By adjustment of the standard condenser, the current flowing through the circuit in which it is contained may be varied. When, by such adjustment, the meter shows a minimum reading, the component of the current through the specimen that is out of phase with the voltage producing it is canceled by the current flowing through the standard condenser, leaving as a reading on the meter only the in-phase current of the specimen, which is due to the power loss or equivalent resistance of the specimen. The minimum current reading and the known voltage then give values from which the equivalent resistance of the specimen and the energy loss may be determined.

The truth of these statements is proved by the following demonstration.

Let E designate the voltage between the terminal 9 and the tap 18. Let the voltage between the tap 18 and terminal 12 be represented by $kE$. (The instrument is so constructed that the ratio of these voltages is known whatever their actual values may be.) Let $C_s$ represent the capacitance of the standard condenser; $I_x$ the current through the meter due to the test specimen; $I_s$ the current through the meter due to the standard condensers; and $I_m$ the current reading of the meter. Assume (what is the fact) that the impedance of the voltage source and meter are negligible compared with the impedance of the specimen.

Then (3) $$I_x = E\left(\frac{1}{R_x} + j\omega C_x\right)$$

in which $$j = \sqrt{-1} \text{ and}$$
$$\omega = 2\pi \text{ frequency}$$

The current due to the standard condenser then is (4) $$I_s = j\omega k E C_s$$

As these two currents oppose one another, the resultant current through the meter will be:

(5) $$I_m = I_x - I_s = E\left[\frac{1}{R_x} + j\omega(C_x - kC_s)\right]$$

When, by adjustment, capacitance $kC_s$ becomes equal to $C_x$, then the expression $j\omega(C_x - kC_s)$ becomes zero. The meter reading is then at the minimum and its value is:

(6) $$I_m = \frac{E}{R_x}$$

from which, since the voltage is known, the equivalent parallel resistance $R_x$ is readily determined.

The energy loss (otherwise known as watts loss) in the specimen is expressed by the formula $$W = \frac{E^2}{R_x}$$

By substitution therein of the value of $R_x$ from Equation 6, such formula becomes (7) $$W = E I_m$$

The known capacitance value of the standard condenser can be translated to determine the capacitance of the test specimen (the ratio of voltages between the tap 18 and the terminals 9 and 12 being known); but in practice it is simpler to read the total current due to the specimen than to calibrate the scale of settings of the standard condenser in terms of the value of $C_x$.

It will be apparent from the foregoing explanation that, when the meter reading is made a minimum by adjustment of the standard condenser, the indication of the meter shows the value of the current in phase with the voltage producing it. Therefore the meter can have its scale calibrated either in terms of watts loss in the specimen at some definite voltage, or in terms of the equivalent alternating current resistance of the specimen; or it may have two or more scales showing these or other values.

The power factor of the specimen may be calculated by the well known formula $$PF\frac{W}{EI}$$

where W is the watts loss at the voltage E, and I is the total current flowing through the specimen due to that voltage. This formula, by substitution of the value of W from Equation 7, becomes (8) $$PF = \frac{I_m}{I}$$

that is, the ratio of the in-phase current component obtained by adjusting the standard condenser, to the total current through the specimen. Consequently the power factor may be determined from meter readings in terms of current only.

The power factor is an important criterion of the condition of insulation, since high power factor indicates generally that the insulation is in poor or deteriorated condition.

Figures 3, 4:
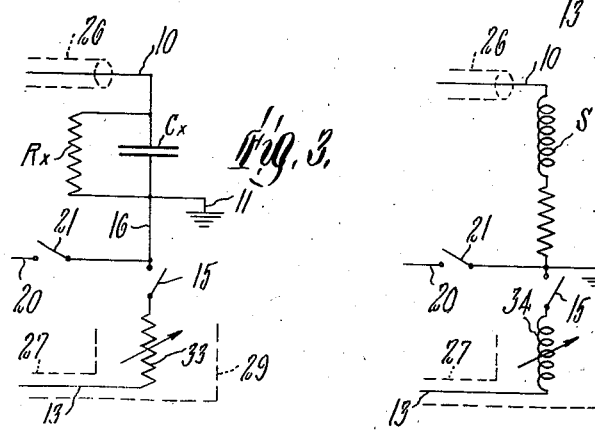
Figs. 3 and 4 are partial diagrams illustrating alternative forms of apparatus within the scope of the invention.

A unique feature of the invention is the balancing of one component of a current which has both in-phase and out-of-phase components, and reading only the other component. The method of balancing the out-of-phase component has been described. The scope of the invention, however, includes balancing the in-phase component and measuring the out-of-phase component. The latter procedure is useful with specimens which have a large resistive component together with a capacitative or inductive reactance. In that case a variable resistance 33 (Fig. 3) is substituted for the variable condenser 14 and is adjusted until the indication on the meter becomes a minimum. The resultant indication then is that due to the out-of-phase component. Such balancing of one component has never been accomplished heretofore to the best of our knowledge and belief. Previously used methods of balancing both components with the aid of a null instrument are time-consuming and require calibrations which are not necessary with our invention.

This principle of balancing one component may be applied to measuring inductance as well as capacitance. For this purpose a variable inductance 34 (Fig. 4) is substituted for the condenser 14 in an apparatus otherwise the same as previously described. In this diagram the specimen S is represented as an inductor. The test voltage is applied to the specimen just as before described, and the variable inductance 34 is adjusted until the meter indication is a minimum, also as described. The out-of-phase current through the specimen is canceled by the current through the variable inductance, and minimum reading of the meter then gives the in-phase component of current, which can be interpreted as indicative of the watts loss in the inductance, while the reading of total current through the specimen gives values indicative of its inductance.

In some circumstances it is desirable to leave the switch 24 closed while making all measurements on a given specimen of insulation. When the apparatus is organized for use in that manner, the scale of the meter is provided with an electrical zero at the point where the indicator rests when affected only by the current passing through resistance 22 at a prescribed voltage, and the scale is calibrated to read in terms of positive and negative watts on opposite sides of the zero indication. This has advantages in testing insulation in the field where strong electrostatic fields may be encountered. The electrostatic influence sets up currents in the specimen being tested, some of which flow through the measuring instrument. With the reversing switch 5 in one position, the induced current due to the electrostatic field may cause the meter to indicate negative watts, and when the switch is reversed to change the phase of the voltage by 180 electrical degrees, a positive indication is given which is greater than that due to the watts loss through the specimen under the test voltage. The average of the two readings with the test voltage first in one phase and then reversed gives the true watts loss through the insulation. In conditions where the positive current is so high that the induced negative current does not entirely cancel it, both readings so taken will be positive. But in all cases the average of the two readings gives the correct value for determining watts loss.

It has been previously stated that the principles of the invention may be embodied in many forms. We have not attempted to show in the drawings the particulars of measuring instruments, transformers, etc. suitable to be used in accordance with the principles herein explained, for it is within the competence of designers and engineers skilled in the art to select parts and equipment available on the market for use in accordance with the teaching of this specification. It is not necessary either to use only the particular types of equipment shown in the illustrative diagrams. We have already shown that a variable inductance, a variable resistance or a variable capacitance may be used interchangeably to obtain certain results. Other changes are possible and are included within the scope of this invention. Thus instead of an alternating current meter as the measuring instrument, a direct current meter in series with a suitable current rectifier of one of the types well known to electrical engineers may be substituted and used in the same manner and to the same effect as the alternating current meter. And instead of a single tapped secondary winding to supply a current opposing that through the test specimen, a second transformer, or a separate secondary winding may be substituted for the portion of the secondary winding 8 between the points 18 and 12. These and other methods of obtaining a balancing voltage of known phase and sufficient magnitude are within the scope of the invention.

The foregoing description contemplates performing the test methods where one terminal of the insulation under test is grounded, as indicated by the ground connection at 11 in the diagrams. However, as previously stated, it is not necessary that the insulation be grounded in order that the method may be performed; in other words, the method may be performed equally well on insulation of which neither terminal, or side, is grounded. In such cases the tap 17 may be connected to ground at the point 30, or at any other convenient point between the secondary winding and the measuring instrument. The procedures and the results obtained are the same in this case as in the cases previously described.

What we claim is:

1. The method of determining the power factor of a capacitor which consists in applying an alternating electromotive force to such capacitor, measuring quantities indicative of the total current through said capacitor, substantially eliminating from the means by which such measurements are taken the out-of-phase component only of said alternating current, and measuring the in-phase component of such current.

2. The method of obtaining measurements determinative of power factor, or the resistive or reactive component, or other values of complex impedances, which consists in applying an alternating electromotive force to a specimen under test in conjunction with measuring means determinative of current, determining values indicative of the total current through said specimen, substantially eliminating from the said measuring means either the in-phase or the out-of-phase component only of the current through said specimen, and determining values indicative of the other component of said current.

3. The method of determining the power factor of a dielectric which consists in applying an alternating electromotive force to the dielectric under test in conjunction with current measuring means, determining quantities proportional to the total current, substantially eliminating one component only of current through the dielectric from said measuring means and measuring quantities proportional to the other component of current.

4. An apparatus for determining the quality of insulation comprising a source of alternating voltage, a lead for connecting said source to one terminal of the insulation under test, a measuring instrument connected with the other terminal of such insulation and with the voltage source so as to indicate both the total amount of alternating current through the insulation due to such voltage and the component of current resulting after adjustment of the hereinafter mentioned balancing means, adjustable balancing means in parallel circuit connection with said measuring means adapted to be adjusted to eliminate from said measuring instrument one component of current and to leave substantially unaffected the other component of current through the insulation, and shielding means constructed and arranged to prevent charging and leakage currents originating in the apparatus from passing through the measuring means.

5. An apparatus for determining the resistive and reactive components of complex impedances, comprising a source of alternating voltage, one terminal of which is connected to one terminal of said complex impedance, measuring means connected to the other terminal of said voltage source, the other terminal of said measuring means being connected to the second terminal of the complex impedance, and means for eliminating one component of current from the measuring means, while leaving the other component substantially unaffected, said measuring means being organized to show values determinative of the other component of current, and of the total current through said impedance.

EDMUND H. POVEY.
ERIC A. WALKER.